United States Patent [19]

Figlarz et al.

[11] Patent Number: 4,539,041

[45] Date of Patent: Sep. 3, 1985

[54] PROCESS FOR THE REDUCTION OF METALLIC COMPOUNDS BY POLYOLS, AND METALLIC POWDERS OBTAINED BY THIS PROCESS

[75] Inventors: Michel Figlarz, Ivry sur Seine; Fernand Fievet, Paris; Jean-Pierre Lagier, Soisy sur Seine, all of France

[73] Assignee: Universite Paris VII, Paris, France

[21] Appl. No.: 563,621

[22] Filed: Dec. 20, 1983

[30] Foreign Application Priority Data

Dec. 21, 1982 [FR] France .................. 82 21483

[51] Int. Cl.³ .............................................. B22F 9/00
[52] U.S. Cl. ................................ 75/0.5 A; 75/0.5 AA
[58] Field of Search ......... 75/0.5 A, 0.5 AA, 0.5 AB, 75/0.5 AC

[56] References Cited

U.S. PATENT DOCUMENTS

| | | | |
|---|---|---|---|
| 3,165,397 | 1/1965 | Lobo | 75/0.5 A |
| 3,285,734 | 11/1966 | Adler | 75/0.5 A |
| 4,349,380 | 9/1982 | Pytlewski et al. | 75/0.5 A |

*Primary Examiner*—Wayland Stallard
*Attorney, Agent, or Firm*—Cushman, Darby & Cushman

[57] ABSTRACT

A process for reducing in a liquid phase a solid compound selected from the oxide, hydroxide or salt of a metal selected from the group consisting of gold, palladium, iridium, osmium, copper, silver, nickel, cobalt, lead and cadmium comprises heating said solid compound suspended in a polyol and thereafter isolating the formed metallic precipitate.

15 Claims, No Drawings

PROCESS FOR THE REDUCTION OF METALLIC COMPOUNDS BY POLYOLS, AND METALLIC POWDERS OBTAINED BY THIS PROCESS

This invention pertains to a process of reduction in a liquid phase of solid metallic compounds, as well as the metallic powders which are obtained by this process.

It is known that metals are commonly used as powders for numerous applications such as the preparation of fritted alloys, porous fritted parts (filters, self-lubricating bearings), composite parts (cermets, . . . ) or the preparation of electricity conducting glues (for instance conductive glues with silver or other metals) or the preparation of catalysts. Furthermore, magnetic metals in powder form can be used especially in the manufacturing of magnetic strips, cards, tickets or disks.

It has now been discovered that it is possible to obtain some metals in micronic powder form through the reduction of various compounds of those metals with polyols. Indeed, it has been discovered that polyols have sufficient reducing power to reduce the initial reactants to the metal stage (oxidizing degree=0).

The process of the invention therefore is useful, especially in the area of powder metallurgy, as a result of its simplicity, its economic character and its easy conversion to an industrial scale for obtaining pure metals.

Furthermore, as the reading of the subsequent experimental part will show, the size and shape of particles, as well as their homogeneity, can be controlled in some cases by adjusting the nature of the initial reactant compound and/or the polyol being used.

The process of the invention can also be applied in an interesting way to the area of extractive metallurgy for certain metals, especially with regard to nickel, copper and cobalt.

The process of this application has a number of surprising features:

in spite of the low solubility of initial reactant solid compounds reduction takes place according to the usual following mechanism: dissolution, reduction in a solution, germinating and growth of metal from the solution. This mechanism can be deduced from the fact that there is no direct affiliation between the shape of particles in the initial reactant compound and that of particles in the formed metal. Moreover, in some specific instances, complete dissolution of the initial reactant product precedes the emergence of the metallic phase and this dissolution can be thus directly observed;

polyols in use under the conditions of the process of the present invention have a reducing power which suffices to allow not only the obtaining of metals that are not very electro-positive but also the obtaining of fairly electro-positive metals such as nickel, cobalt or lead. It is also surprising to observe that the process makes it possible to obtain lead and no tin, whereas these two metals possess comparable levels of electro-positivity.

This invention pertains to a process of reduction in a liquid phase of a solid initial reactant compound selected from oxides, hydroxides, or metallic salts, characterized by the fact that said solid compound of a metal that is selected from the group comprised of gold, palladium, platinum, irridium, osmium, copper, silver, nickel, cobalt, lead, and cadmium is submitted to reduction with a polyol by heating a suspension of the said initial reactant compound in a polyol or a liquid mixture of polyols at the reaction temperature, and the formed metallic precipitate is isolated therefrom.

It is stressed that the process of the invention can be achieved without having to resort to special measures designed to previously render soluble the solid initial reactant compound (the latter, even if it is not very soluble, gradually becomes soluble in the polyol). The process proceeds especially with a lack of added water and without having to require the use of strictly anhydrous initial reactant products.

Furthermore, it is observed that, in some cases, the obtained metallic powder includes carbon insertions, either in the form of a solid solution, or in the form of a well-defined carbide.

Thus, by treating crystallized nickel hydroxide marketed by RIEDEL de HAEN, in diethylene glycol, triethylene glycol or tetra-ethylene glycol, at boiling, a black non-magnetic compound is obtained and which is identified by its spectrum under X rays as being the carbide $Ni_3C$. The treatment of nickel powder in these glycols at boiling also leads to the formation of this carbide. With cobalt hydroxide, carburation, in a less significant way is also observed.

Nickel and cobalt carbides can especially be used as loads in plastic substances.

In a specific embodiment, the process of this invention can also display the following characteristics, taken singly or in combination:

the process is carried out usually at a temperature above 85° C., especially at a temperature that exceeds 100° C. For instance, the reaction is conducted at the boiling temperature of the polyol, especially between 100° and 350° C., or else in other instances between 150° and 350° C.; the process can also proceed at a temperature which is lower than the boiling temperature; it is possible either to place in suspension the cooled initial reactant product in polyol then heat it, or place in suspension the initial reactant product in an already heated polyol;

the polyol is either an aliphatic glycol, or a corresponding glycol polyester, which is liquid at the reaction temperature; said aliphatic glycol for instance is an alkylene glycol having up to 6 carbon atoms in the main chain, or ethanediol, a propanediol, a butanediol, a pentanediol or a hexanediol, as well as polyalkylene glycols derived from these alkylene glycols;

said polyol is selected from the group consisting of ethylene glycol, diethylene glycol, tri-ethylene glycol, propylene glycols, butanediols, dipropylene glycol and polyethylene glycols liquid at the reaction temperature, for instance polyethylene glycol 300;

said polyol is glycerol;

the reducing reaction is conducted for a time sufficient so that the reaction is complete or so that the conversion ratio has reached a minimal pre-set limit; usually this time period varies between several dozen minutes and several days;

in some cases the reaction is favored by allowing a reducing gas, such as hydrogen for instance, to mix in the reaction;

at the end of the reaction the formed metallic precipitate is isolated, for instance by filtering or centrifuging.

Particularly interesting polyols include the following series of diols: ethylene glycol, diethylene glycol, tri-ethylene glycol, tetra-ethylene glycol, propanediol-1,2, di-propylene glycol, butanediol-1,2, butanediol-1,3, butanediol-1,4 and butanediol-2,3. The use of these glycols is advantageous because of their significant reducing power, their boiling temperature scaled between 185° and 328° C., their proper thermal stability and their low cost price. Furthermore, these glycols raise few toxic problems.

When the reducing reaction is difficult to effect with ethylene glycol it is often possible to obtain better results, with less significant reaction time frames, by using higher homologues (di-ethylene glycol, tri-ethylene glycol, etc . . . ). For instance this is true for lead and cadmium. However this is not a general rule.

It should be stated that, under proper circumstances, 100 g of metal can be produced with about 1 to 2 liters of polyol.

From an economic standpoint, it is interesting to note that solvents can be re-used in two ways: either directly after powder separation following the reaction, or by re-treating this liquid residue by fractional distillation.

It is possible to vary the morphological characteristics of the obtained samples by adjusting different parameters for instance:

reducing temperature,
nature of polyol being used,
nature of the start-off compound.

Rational use of these factors, together with experimental observation, makes it possible to obtain grains with highly varied shapes and sizes. This is illustrated by the following experimental section.

Furthermore, the apparent mass volume (MVA) which is a significant feature in the area of powders, can vary with the preparation method in use.

Hence, with copper and nickel, the following values were obtained:

copper: AMV varying between 0.7 and 3.1 g/cm$^3$
nickel: AMV varying between 0.35 and 1.6 g/cm$^3$ Also, it is interesting to note that of all the obtained powders, even though often very fine, pyrophoricity phenomena were never observed (an interesting point especially with regard to cobalt and nickel where, through a dry path, pyrophoricity is often the rule).

The invention especially pertains to a process as described above where:

the initial reactant product is nickel hydroxide Ni(OH)$_2$, nickel oxide NiO or a nickel salt, for instance acetate;

the initial reactant product is copper hydroxide Cu(OH)$_2$, a copper oxide (CuO or Cu$_2$O) or a copper salt for instance copper acetate or copper sulfate;

the initial reactant product is a silver salt such as silver acetate;

the initial reactant product is cobalt hydroxide Co(OH)$_2$, cobalt oxide Co$_3$O$_4$ or a cobalt salt;

the initial reactant product is lead oxide PbO or a lead salt;

the initial reactant product is cadmium hydroxide Cd(OH)$_2$ or a cadmium salt.

The invention also pertains to metallic powders obtained by the process which is described above, and especially metallic powders which are described below in the experimental part.

The following examples illustrate the invention without being however limiting.

EXAMPLE 1

Nickel hydroxide Ni(OH)$_2$ is used as an initial reactant product of technical quality which is marketed by the RIEDEL de HAEN company; 12 g of this product are suspended in 200 cm$^3$ of ethylene glycol inside a glass balloon which rests on a balloon heater which is equipped with a magnetic stirring system. The balloon is surmounted by a conventional condenser that is cooled by water circulation. The solution is maintained boiling at reflux. Boiling continues for 68 hours, is when heating stopped and the reaction mixture is left to cool. Through centrifuging, the black precipitate powder is separated from the solution which itself is blackish. The precipitate is cleaned several times with alcohol at intermediate centrifuging. The solid product that is obtained after drying is provided in the form of a fine, black, magnetic powder. An X-ray examination shows that it is metallic nickel. An examination under an electron scanning microscope shows that the metallic particles are fairly hexagonal disks with an average diameter of 0.3 micrometer. The transformation is nearly quantitative.

EXAMPLE 2

In a similar way, by treating crystallized nickel hydroxide which is prepared with an autoclave according to the process described in reference (1), after 6 days at boiling in ethylene glycol a metallic nickel powder in the shape of spherical particles with an average diameter of 2 micrometers is obtained. Reference (1): S. LE BIHAN, M. FIGLARZ, Thermo-chimica Acta, 6 (1973) pp. 319–326.

EXAMPLE 3

In a similar way, turbostratic nickel hydroxide, which is prepared according to the process in reference (2) and treated at boiling in ethylene glycol for 42 hours, yields a nickel powder in the form of fairly homogeneous spherical particles with an average diameter of 1 micrometer; these particles tend to agglutinate into strands. Reference (2): S. LE BIHAN, J. GUENOT, M. FIGLARZ, C. R. Acad. Sci. Paris series C, vol. 270, pp. 2131–2133 (1970).

EXAMPLE 4

In a similar way, by heating at boiling in ethylene glycol for 6 days a very fine nickel oxide NiO prepared according to the process in reference (3), the precipitation of nickel in the shape of irregular and lamellar particles (average diameter of particles: 0.1 micrometer) which agglutinate into a mass is observed. Reference (3): F. FIEVET, M. FIGLARZ, J. Catalysis, 39 (1975) pp. 350–356.

EXAMPLE 5

In a similar way, by boiling at reflux in an excess of ethylene glycol for 24 hours cobalt hydroxide Co(OH)$_2$ which is marketed by the RIEDEL de HAEN company, cobalt particles that are roughly spherical with an average diameter of 1 micrometer are obtained; these particles tend to agglutinate into strands.

EXAMPLE 6

In a similar way, commercial cobalt oxide Co$_3$O$_4$ (PROLABO) which is treated for 3 days at boiling in ethylene glycol, also leads to the obtaining of cobalt in the shape of spherical particles that are spiked with points. These particles possess an average diameter of 5 micrometers.

Emphasis is made regarding the very low reducing temperature of Co$_3$O$_4$ with this process whereas with the dry method reduction by hydrogenation requires higher temperatures for a complete reaction.

EXAMPLE 7

In a similar way, a commercial copper hydroxide Cu(OH)$_2$, sold by KEK, is boiled at reflux in ethylene glycol for 1 hour and 30 minutes and very fine copper particles which are rough-shaped spheres and fairly homogeneous are obtained (average diameter=0.3 micrometer).

EXAMPLE 8

By treating in a similar way copper acetate (CH$_3$COO)$_2$Cu, H$_2$O which is marketed by MERCK at boiling in ethylene glycol for 2 hours and 30 minutes, copper particles with an average diameter of about 1.8 micrometers are obtained.

EXAMPLE 9

In a similar way, commercial CuO (MERCK) is boiled in ethylene glycol for 3 hours. Copper particles which are hexagonal and heterogeneous in size (between 0.5 and 2 micrometers) with facets are obtained. On rough particles a type of geometric "crevace" is frequently noticed.

EXAMPLE 10

In a similar way, copper sulfide CuSO$_4$, 5H$_2$O (PROLABO) is boiled at reflux in glycerol and yields a copper precipitate in the shape of a mixture of rough spherical particles, with an average diameter of about 5 micrometers, and small rods of about 10 micrometers in length and several micrometers wide.

EXAMPLE 11

In a similar way, commercial (KEK) Cu(OH)$_2$ hydroxide which is is boiled at reflux in glycerol for 1 hour and 30 minutes is transformed into metallic copper. The particles which are obtained are relatively fatter than those obtained with ethylene glycol; the average diameter of the particles that is observed equals about 1 micrometer. Facets with "crevaces" are noted on the largest particles.

EXAMPLE 12

In a similar way, lead oxide PbO (PROLABO) which is treated at boiling in tri-ethylene glycol for 1 hour and 30 minutes yields a lead powder in the shape of small rods with about 0.5 micrometer in length and less than 0.1 micrometer wide, with a tendency to agglutinate in spherical masses with an average diameter of about 2 micrometers, each mass being comprised of embedded small rods.

EXAMPLE 13

In a similar way, cadmium hydroxide Cd(OH)$_2$ (CARLO ERBA) which is treated in di-ethylene glycol at boiling for 3 hours and 30 minutes, yields a suspension with metallic cadmium.

EXAMPLE 14

By proceeding in a similar way, with Co(OH)$_2$ as the initial reactant, in diethylene glycol, the transformation reaction into metallic cobalt is almost complete after 1 hour and 30 minutes.

EXAMPLE 15

By proceeding in a similar way, silver acetate (PROLABO) is boiled in ethylene glycol for several hours and a silver powder in the shape of rough spherical grains with an average diameter of about 2 micrometers is obtained.

EXAMPLE 16

By proceeding in a similar way, with nickel acetate Ni(CH$_3$COO)$_2$,4H$_2$O (VENTRON) as the initial reactant which is boiled for 2 hours and 30 minutes in ethylene glycol, nickel powder in the shape of almost spherical and homogeneous particles with an average diameter of about 0,3 micrometer is obtained.

EXAMPLE 17

Lead oxide PbO (PROLABO) which is treated for 2 hours in tetra-ethylene glycol at boiling yields metallic lead particles with very geometric shapes: spheres, mixed tetrahedrons and octahedrons, measuring 1 to 2 micrometers according to their largest size.

EXAMPLE 18

The reduction of PbO when conducted in di-ethylene glycol, yields very crevaced spherical particles, with a diameter of about 2 micrometers.

EXAMPLE 19

Boiling 2 g of CuO, marketed by Merck, in 100 cm$^3$ of polyethylene glycol 300 for 3 hours yields metallic copper in the shape of grains measuring several tenths of a micrometer.

EXAMPLE 20

Into 100 cm$^3$ of propylene glycol (propane diol-1,2) (B.T.=189° C.) (B.T.=boiling temperature) there are added 5 g of PbO. The resulting mixture is maintained at the boil for 20 hours, yielding metal Pb. The particles that are obtained are quite original: it consists of a mixture of long narrow strands (0.5 micrometer out of 10 or several dozen micrometers) with small plates which are more or less compact with a diameter of about 0.5 micrometer.

EXAMPLE 21

In 100 cm$^3$ of di-propylene glycol (B.T.=230° C.), maintained at the boil for 22 hours, 4 g of Ni(OH)$_2$ marketed by Riedel de Haen, yield metallic nickel.

EXAMPLE 22

Use of various butanediols (a) Reduction of Ni(OH)$_2$ RIEDEL de HAEN
Use of butanediol-1,2 (B.T.=191° C.)
2 g of Ni(OH)$_2$, which are treated in 100 cm$^3$ of this solvent and maintained for 68 hours at boiling, yield metallic nickel.
Use of butanediol-1,3 (B.T.=207° C.)
Under the same circumstances (2 g-100 cm$^3$-68 hours) the powder that is obtained here is light green and it does not contain nickel.
Use of butanediol-1,4 (B.T.=230° C.)
By operating as before, but reducing the heating period (18 hours), the reaction yields a nickel powder.
Use of butanediol-2,3 (B.T.=185° C.)
Under the same circumstances (2 g-100 cm$^3$-18 hours) the same result is obtained as with butanediol-1,4.

(b) Reduction of turbostratic Ni(OH)$_2$

It is observed that this peculiar hydroxide is more difficult to reduce to a metal. By using the same conditions (2 g-100 cm$^3$-68 hours), with respect to the four butanediols it is observed that only butanediol-2,3 enables a sizeable production of nickel.

(c) Conclusion on the use of butanediols

It is observed that with these four isomers that reduction depends on the relative positions of the 2 alcohol functions, and the best reducer is surprisingly the one which has the lowest B.T. (butanediol-2,3). The least efficient reducer out of the four is butanediol-1,3: however it is realized that the latter enables CuO reduction into Cu. It is also noted that the temperature factor is not necessarily the one which prevails if consideration is given to the reducing power of a diol.

EXAMPLE 23

Use of an ethylene glycol-glycerol mixture

In a 10 liter balloon 325 g of technical CuO sold by PROLABO are treated in 5 liters of a solution comprised of 3 liters of ethylene glycol and 2 liters of glycerol.

This mixture is stirred; after a rise in temperature of about 1 hour, then the maintenance for 1 hour of said solution at a temperature of 196±4° C., the reaction mixture is left to cool with stirring until 170° C. and the further cooling of the reaction mixture is then terminated without stirring. After washing with alcohol 254 g of copper whose basic grains possess an average diameter between 1 and 4 micrometers are recovered.

EXAMPLE 24

Comparative example

From the previous examples it is seen that many polyols, as well as polyesters from these polyols (those from ethylene glycol and prolylene glycol for instance), can be used according to the process of the invention.

Monohydric alcohols do not appear suitable: as a comparison, $Cu(OH)_2$ was boiled for one hour and thirty minutes boiling in octanol which has a temperature that equals roughly that of ethylene glycol: instead of metallic copper, a $CuO+Cu_2O$ mixture is obtained; reduction is only very partial wherever it is complete with ethylene glycol. It is also noted that the same octanol does not reduce $Ni(OH)_2$ (RIEDEL de HAEN), after more than 50 hours at boiling.

EXAMPLE 25

Production of silver at 86° C.

1 g of silver acetate is introduced into 150 cm³ of glycerol; the temperature of the stirred solution is maintained at 86° C. for about 22 hours. Silver with grains shaped like round pebbles, with an average diameter included between 1 and 3 micrometers is obtained.

EXAMPLE 26

Production of silver at 155° C.

2 g of CuO MERCK are stirred with 100 cm³ of ethylene glycol for 17 hours with a temperature that is maintained at 155° C. The grains from the resulting copper (free of CuO) are irregular polyhedrons measuring 5 to 10 micrometers which tend to form compact aggregates. On the other hand, CuO treatment at 127° C. is ineffective.

EXAMPLE 27

Use of an auxiliary reducing gas

The use of an auxiliary reducing gas can improve yield in reduction and speed up reduction kinetics.

For instance, hydrogen can be used. The efficiency of this catalyst is illustrated in the following example.

A solution of 200 cm³ of ethylene glycol which contains 4 g of $Ni(OH)_2$ sold by RIEDEL de HAEN and the further cooling of the reaction mixture is then terminated without stirring. After washing gaseous hydrogen being bubbled in bubble by bubble. After this treatment the powder which is obtained turns out to be especially made of metal Ni with a remainder of hydroxide.

The overall character of the effects that are produced by the use of an auxiliary reducing gas is noted which gas was illustrated in one example; ultimately reducing gasses other than hydrogen can be used.

EXAMPLE 28

Influence of temperature on grain size

In order to illustrate this effect 2 g of CuO in 100 cm³ of polyol are treated at various temperatures:
  ethylene glycol at 150° C.-(size 7.5 micrometers)
  ethylene glycol (BT=197° C.) at boiling-(size 2.5 micrometers)
  di-ethylene glycol (BT=245° C.) at boiling-(size 0.2 micrometer)
  tri-ethylene glycol (BT=278° C.) at boiling-(size 0.2 micrometer)
  tetra-ethylene glycol (BT=328° C.) at boiling-(size 0.3 micrometer)
  polyethylene glycol 300 at boiling (size 0.3 micrometer).

The average diameter of particles as obtained is greater when the reactive temperature is lower.

EXAMPLE 29

170 g of $Cu_2O$ oxide (KOCH LIGHT) in a mixture of 450 cm³ of ethylene glycol+300 cm³ of glycerol are treated by maintaining this solution at boiling for 21 hours. Under these circumstances metallic copper shaped like fine grains mixed with much larger masses is obtained.

EXAMPLE 30

In 100 cm³ of di-ethylene glycol at boiling 1 g of cobalt oxalate $CoC_2O_4, 2H_2O$ is treated; after 69 hours metallic cobalt (mixed cubic and hexagonal phases) is obtained.

EXAMPLE 31

Obtaining carbides

In 200 cm³ of tri-ethylene glycol 2 g of $Ni(OH)_2$ sold by RIEDEL de HAEN are treated by maintaining the mixture with stirring and at the boil for 140 hours. The solid residue that is extracted is comprised of a $Ni_3C+Ni(OH)_2$. $Ni_3C$ can be isolated by selectively dissolving the hydroxide with hydrochloric acid.

In the case of cobalt hydroxide sold by REIDEL de HAEN carburation is also observed although less clearly. Indeed, this hydroxide which was treated in tri-ethylene glycol at boiling makes it possible to obtain a black magnetic phase which contains cobalt and carbon in a weight ratio close to 10.

We claim:

1. A process for reducing in a liquid phase a solid compound, said solid compound being a metal selected from the group consisting of gold, palladium, platinum, iridium, osmium, copper, silver, nickel, cobalt, lead and cadmium in the form of an oxide, hydroxide or salt thereof, comprising heating said compound suspended in a polyol for a time effective to reduce said compound and thereafter isolating the formed metallic precipitate.

2. The process of claim 1 wherein said solid compound suspended in said polyol is heated at a temperature of at least 85° C.

3. The process of claim 1 wherein said solid compound suspended in said polyol is heated at a temperature ranging from 100° to 350° C.

4. The process of claim 1 wherein said polyol is an aliphatic glycol or a corresponding glycol polyester that is liquid at the reaction temperature.

5. The process of claim 1 wherein said polyol is an alkylene glycol containing up to 6 carbon atoms in the main chain or a polyalkylene glycol derivative thereof.

6. The process of claim 1 wherein said polyol is selected from the group consisting of ethylene glycol, propylene glycol, butanediol, dipropylene glycol and polyethylene glycol that is liquid at the reaction temperature.

7. The process of claim 6 wherein said polyethylene glycol is selected from the group consisting of diethylene glycol, triethylene glycol, tetraethylene glycol and polyethylene glycol 300.

8. The process of claim 1 wherein said polyol is glycerol.

9. The process of claim 1 wherein said solid compound is nickel hydroxide $Ni(OH)_2$, nickel oxide NiO or a nickel salt.

10. The process of claim 1 wherein said solid compound is copper hydroxide $Cu(OH)_2$, copper oxide having the formula CuO or $Cu_2O$, or a copper salt.

11. The process of claim 1 wherein said solid compound is a silver salt.

12. The process of claim 1 wherein said solid compound is cobalt hydroxide $Co(OH)_2$, cobalt oxide $Co_3O_4$ or a cobalt salt.

13. The process of claim 1 wherein said solid compound is lead oxide PbO or a lead salt.

14. The process of claim 1 wherein said solid compound is cadmium hydroxide $Cd(OH)_2$ or a cadmium salt.

15. A metallic powder produced in accordance with the process of claim 1.